US007654937B2

(12) United States Patent  
Baydzhanov (10) Patent No.: US 7,654,937 B2  
(45) Date of Patent: Feb. 2, 2010

(54) METHODS AND SYSTEMS FOR LEARNING AND PRACTICING SLALOM

(76) Inventor: Vladimir Baydzhanov, 22-3 ul. Zhitomirskaya, Kaliningrad (RU)

( * ) Notice: Subject to any disclaimer, the term of this patent is extended or adjusted under 35 U.S.C. 154(b) by 0 days.

(21) Appl. No.: 11/479,363

(22) Filed: Jun. 30, 2006

(65) Prior Publication Data
US 2006/0247105 A1    Nov. 2, 2006

Related U.S. Application Data

(63) Continuation of application No. PCT/RU2004/000529, filed on Dec. 29, 2004.

(30) Foreign Application Priority Data

Dec. 30, 2003    (RU) ............... 2003137747

(51) Int. Cl.
*A63B 69/18*    (2006.01)
(52) U.S. Cl. .......................................... 482/71; 482/70
(58) Field of Classification Search ............ 482/70–71, 482/14, 23, 51–52, 62–63, 66, 74, 79–80; 434/253; 441/74; D21/766–769
See application file for complete search history.

(56) References Cited

U.S. PATENT DOCUMENTS

| | | | | |
|---|---|---|---|---|
| 3,704,885 A | * | 12/1972 | Raciunas | 482/71 |
| 3,807,727 A | * | 4/1974 | Ferguson | 482/71 |
| 4,386,915 A | * | 6/1983 | Gilliam | 434/253 |
| 4,544,153 A | * | 10/1985 | Babcock | 482/71 |
| 4,595,195 A | * | 6/1986 | Miehlich | 482/71 |
| 4,607,839 A | * | 8/1986 | Knudson | 482/71 |
| 4,669,723 A | * | 6/1987 | Arsenian | 482/71 |
| 4,744,557 A | * | 5/1988 | Smirmaul | 482/71 |

(Continued)

FOREIGN PATENT DOCUMENTS

SU    1493272 A1    7/1989

(Continued)

OTHER PUBLICATIONS

Notification of Transmittal of Translation of the International preliminary Report on Patentability (Chapter 1 or Chapter II of the Patent Cooperation Treaty), Oct. 26, 2006, pp. 1-7, The Int. Bureau of WIPO, Geneva, Switzerland, in a parent PCT application No. PCT/RU2004/000529.

*Primary Examiner*—Lori Baker
(74) *Attorney, Agent, or Firm*—MIchael Fainberg (57) ABSTRACT

Disclosed method and systems for learning and practicing slalom. An example method includes moving the slalomist's feet, skis or board mounted on a movable platform of a slalom simulator, together with the platform relative to a base of the slalom simulator periodically left-right, rotating the slalomist's feet, skis or board together with the platform periodically clockwise-counterclockwise in a plane of a simulated slalom route, wherein said movement and rotation are carried out with unchangeable direction of a longitudinal axis of the slalomist's feet, skis or board relative to the platform, synchronously and with an inclination of the slalomist's feet relative to the plane of the simulated slalom route, reversing said movement and rotation alternatively with the shifting of the initial phases of said motions, and moving the base of the slalom simulator forward along the axis of the simulated slalom route.

14 Claims, 10 Drawing Sheets

U.S. PATENT DOCUMENTS

| | | | |
|---|---|---|---|
| 4,744,558 A * | 5/1988 | Smirmaul | 482/71 |
| 4,744,576 A * | 5/1988 | Scollan, Jr. | 280/87.042 |
| 4,906,192 A * | 3/1990 | Smithard et al. | 434/253 |
| 4,940,226 A * | 7/1990 | Carra | 482/51 |
| 4,993,704 A * | 2/1991 | Luczynski | 482/70 |
| 5,049,079 A * | 9/1991 | Furtado et al. | 434/253 |
| 5,318,488 A * | 6/1994 | Babcock | 482/51 |
| 5,342,266 A * | 8/1994 | Dailey | 482/71 |
| 5,374,228 A * | 12/1994 | Buisman et al. | 482/71 |
| 5,413,545 A * | 5/1995 | Bermann | 482/71 |
| 5,429,567 A * | 7/1995 | Gerschefske et al. | 482/70 |
| 5,496,239 A * | 3/1996 | Kallman et al. | 482/71 |
| 5,536,225 A * | 7/1996 | Neuberg et al. | 482/71 |
| 5,649,865 A * | 7/1997 | Harvey | 472/90 |
| 5,690,591 A * | 11/1997 | Kenmochi et al. | 482/71 |
| 6,257,614 B1 * | 7/2001 | Duggan | 280/618 |
| 7,090,621 B2 * | 8/2006 | Loane | 482/71 |
| 7,115,073 B2 * | 10/2006 | Nizamuddin | 482/51 |
| 2004/0152567 A1 * | 8/2004 | Stafiej et al. | 482/71 |

FOREIGN PATENT DOCUMENTS

SU    1655526 A1    6/1991

\* cited by examiner

METHODS AND SYSTEMS FOR LEARNING AND PRACTICING SLALOM

CROSS-REFERENCE TO THE RELATED APPLICATIONS

This is a continuation of International Application No. PCT/RU2004/000529, with an international filing date of Dec. 29, 2004, which claims benefit of priority of Russian Patent Application No. 2003137747 filed Dec. 30, 2003, which issued as Russian Patent No. 2,276,615 on May 20, 2006.

FIELD OF THE INVENTION

The invention relates to sports, in particular to methods for teaching slalom, to devices for exercising and developing skills for slalom skiing using downhill or water ski or a snowboard and to entertainment devices.

BACKGROUND OF THE INVENTION

Known is a number of methods for teaching and training mountain-skiers, snowboardists, and water-skiers beyond real routes, and also a number of apparatuses that implement such methods.

Thus, known is a method for teaching and training a slalomist, implemented by an apparatus of U.S. Pat. No. 3,524,641, and comprising the steps of left/right moving the slalomist's leg feet alternately in simulation of motions on a bearing surface of a platform, said slalomist standing on a bearing surface of the platform, wherein the slalomist maintains equilibrium using sticks that are supported on a floor or a base.

The disadvantage of the prior art method is inadequacy of motions of the slalomist's leg feet and body to simulated conditions in part of varying a direction of the skis' movement, said inadequacy being caused by the technical solution to implement the apparatus that realizes only a translational motion of a load-bearing member with the platform.

Methods for teaching and training slalomists are also known that are realized by apparatuses in which a rotary platform having a bearing surface for the leg feet, the skis or the snowboard performs a left/right plane-parallel motion in straight lines (see U.S. Pat. No. 5,078,389) or along an arc (see U.S. Pat. No. 3,511,499; FR 1,486,082) or along an arc on a load-bearing member made as a beam-rod cantilever (NL 8,702,665; U.S. Pat. No. 4,846,463).

With such methods for teaching and training, the leg feet with the skis can take any position in which the axes of the skis can be directed in any direction, and it is also possible to simulate variation in a direction of the motion.

Said methods, however, are ineffective for students who wish to correct own techniques of skiing, have no proper skills yet, cannot locate their leg feet (longitudinal axes of the skis) correctly depending upon a certain position of legs in a trajectory of left/right motion. Owing to absence of dependency between the turn of the leg feet in a sliding plane and a location in the trajectory of left/right motion in said methods, an action onto a slalomist does not reproduce a real situation, and there is impossible to repeat exercises many times and accurately to generate proper necessary skills.

The closest in the technical essence to the inventive method and slalom simulator are a method for teaching and training slalomists, comprising the steps of periodical left/right moving slalomist's leg feet mounted on a movable platform of a slalom simulator, together with the platform, relative to a base simultaneously with rotating the leg feet together with the platform and reversing said left/right movement and said rotation of the leg feet together with the platform, and also a slalom simulator comprising a base, a load-bearing member mounted on the base so as to move to the left/right, a platform mounted on said member so as to rotate and having a bearing surface for the slalomist's leg feet, the skis or the snowboard, and a crank-slotted link mechanism for synchronizing and reversing said movement of the load-bearing member and said rotation of the platform (see U.S. Pat. No. 3,704,885).

The disadvantage of the prior art method and slalom simulator is a discrepancy between an angular position of the leg feet when they move to the left/right and their real position in slalom shussing, because axes of legs (axes of the skis) in extreme points of movement are directed not along an axis of a slalom route as should be in a real route; further, the axes of the skis in a middle position of the load-bearing member (between the extreme points of the left/right movement of the load-bearing member) are not at angle to the axis of the route. As a result, the teaching and training of the slalomist does not create conditions corresponding to the law of motion of the slalomist in the real slalom route.

SUMMARY OF THE INVENTION

Briefly, and in general terms, disclosed herein are methods for teaching and training a slalomist and slalom simulator configured to create conditions during teaching and training that correspond to the law of motion of the slalomist in the real slalom route. In particular, the slalom simulator performs multiple repetition of cyclic movements of the slalomist's feet and body under conditions similar to those occurring in real skiing conditions along the slalom route and accompanied by respective perceptions.

In one embodiment, a method for learning and practicing a slalom movement in combination with a slalom simulator, comprises moving the slalomist's feet, skis or board are continuously mounted on a movable platform of a slalom simulator, together with the platform relative to a base of the slalom simulator periodically left or right, rotating the slalomist's feet, skis or board together with the platform periodically clockwise or counterclockwise in a plane of a simulated slalom route, wherein said movement and rotation of the slalomist's feet, skis or board together with a platform being carried out with unchangeable direction of a longitudinal axis of the slalomist's feet, skis or a board relative to the platform, synchronously and with an inclination of the slalomist's legs relative to the plane of the simulated slalom route, and reversing said movement and rotation of the slalomist's feet, skis or board together with the platform being carried out alternatively with the shifting of the initial phases of said motions.

In one embodiment, the clockwise rotation of slalomist's feet, skis or snowboard is performed concurrently with the leftward movement thereof from a middle position to the leftmost position and back to the middle position, and the counterclockwise rotation of slalomist's feet, skis or snowboard is performed concurrently with the rightward movement thereof from the middle position to the rightmost position and back to the middle position, wherein an angle between a longitudinal axis of the feet, skis or snowboard and a plane of symmetry of the leftmost and rightmost positions thereof is at its maximum value when the feet, skis or snowboard are in the middle position, and zero or minimum value when the he feet, skis or snowboard are at the leftmost and rightmost positions.

In one embodiment, the left-right movement and rotation of the slalomist's feet, skis or snowboard are effected by one or more of a force applied by the slalomist and an external force applied by a movement drive of the slalom simulator. Furthermore, the left-right movement and rotation of the slalomist's feet, skis or snowboard are carried out with edging and disfooting, and by counteracting said movement. Moreover, the left-right movement comprises a short onward movement in the substantial vicinity of a leftmost and a right most positions of the slalomist's feet, skis or snowboard.

In another embodiment, a method for learning and practicing a slalom movement in combination with a slalom simulator, comprises moving the slalomist's feet, skis or board are continuously mounted on a movable platform of a slalom simulator, together with the platform relative to a base of the slalom simulator periodically left or right, rotating the slalomist's feet, skis or board together with the platform periodically clockwise or counterclockwise in a plane of a simulated slalom route, wherein said movement and rotation of the slalomist's feet, skis or board together with a platform being carried out with unchangeable direction of a longitudinal axis of the slalomist's feet skis or a board relative to the platform, synchronously and with an inclination of the slalomist's legs relative to the plane of the simulated slalom route, and reversing said movement and rotation of the slalomist's feet, skis or board together with the platform being carried out alternatively with the shifting of the initial phases of said motions, and moving the base of the slalom simulator forward along the axis of the slalom route.

In yet another embodiment, a slalom simulator comprises a base, a load-bearing member mounted on the base and operable to move left or right with respect to the base, and a platform mounted on the load-bearing member and operable to rotate periodically clockwise or counterclockwise, the platform includes a bearing surface operable to support slalomist's feet, skis or board, and a crank-slotted link mechanism for synchronizing and reversing said movement of the load-bearing member and said rotation of the platform, wherein the slotted link is fastened on the base and provides a closed trajectory of movement for a slider mounted thereon, for moving in one direction thereon, and to provide a regularity of movement of the platform relative to the base in accordance with principles of slalom movements, at least with respect to the translational motion of the slalomist's feet, skis or board during the movement thereof and the variation of the angular position of the slalomist's feet, skis or board during rotation thereof and an onward movement thereof.

In one embodiment, the slotted link is shaped such that, when the slider moves thereon, said shape provides clockwise rotation of the platform relative to the base at movement of the load-bearing member from a middle position to the left till an extreme point and back to the right till a middle position, and further counterclockwise rotation at movement of the load-bearing member from the middle position to the right till an extreme point and back to the left till a middle position and till achievement of maximum values of an angle between a longitudinal axis of the feet, the skis or the snowboard being mounted onto the bearing surface and a position symmetry plane of extreme points of the load-bearing member movement when the platform is in the middle position between the extreme points, and till achievement of zero or minimum values of said angle when the platform is at the extreme points. Furthermore, the platform of the slalom simulator maybe mounted so as to make a short move onward within end sections of the left/right movement of the load-bearing member.

The slalom simulator further comprises means for excluding a variation in a direction of the movement of the slider over the slotted link and respectively rotation of the platform at the extreme points of reversing the movement of the load-bearing member, and simultaneously to generate a force that counteracts the movement of the load-bearing member from the middle portion of the trajectory towards the extreme points of the movement of said member. The slalom simulator further comprises at least one bed connected to the platform, and the bearing surface is formed on the bed. The slalom simulator further comprises two beds, wherein the beds are movably connected to the platform so as to offset in reciprocation relative to each other towards the longitudinal axis of the leg feet, the skis or the snowboard placed at the bearing surface, and so as to rotate them relative to axes parallel to their bearing surfaces. The slalom simulator further comprises a load-bearing member movement drive.

In yet another embodiment, the slalom simulator comprises a base, a load-bearing member mounted on the base and operable to move left or right with respect to the base, and a platform mounted on the load-bearing member and operable to rotate periodically clockwise or counterclockwise, the platform includes a bearing surface operable to support slalomist's feet, skis or board, and a crank-slotted link mechanism for synchronizing and reversing said movement of the load-bearing member and said rotation of the platform, wherein the slotted link is fastened on the base and provides a closed trajectory of movement for a slider mounted thereon, for moving in one direction thereon, and to provide a regularity of movement of the platform relative to the base in accordance with principles of slalom movements, at least with respect to the translational motion of the slalomist's feet, skis or board during the movement thereof and the variation of the angular position of the slalomist's feet, skis or board during rotation thereof and an onward movement thereof.

BRIEF DESCRIPTION OF THE DRAWINGS

FIGS. 17 and 18 are graphs of a law of a compound motion of the platform relative to the base of the simulator as a function of time t for both the inventive simulator and the simulator of the closest prior art, said motion consisting of a translational motion that is the left/right movement of the load-bearing member for a distance S relative to the base (a solid-line curve) and a relative motion that is the motion of turning the platform by an angle φ when said platform rotates relative to the load-bearing member (a dashed-line curve), wherein positive values of the ordinate S are selected for positions of the load-bearing member from the left of the slalom route axis, and positive values of the ordinate φ are selected for angular positions of the platform having a direction of a longitudinal axis of the feet with their fingers to the left from a direction of the slalom route axis.

DETAILED DESCRIPTION OF THE INVENTION

Figure 1:
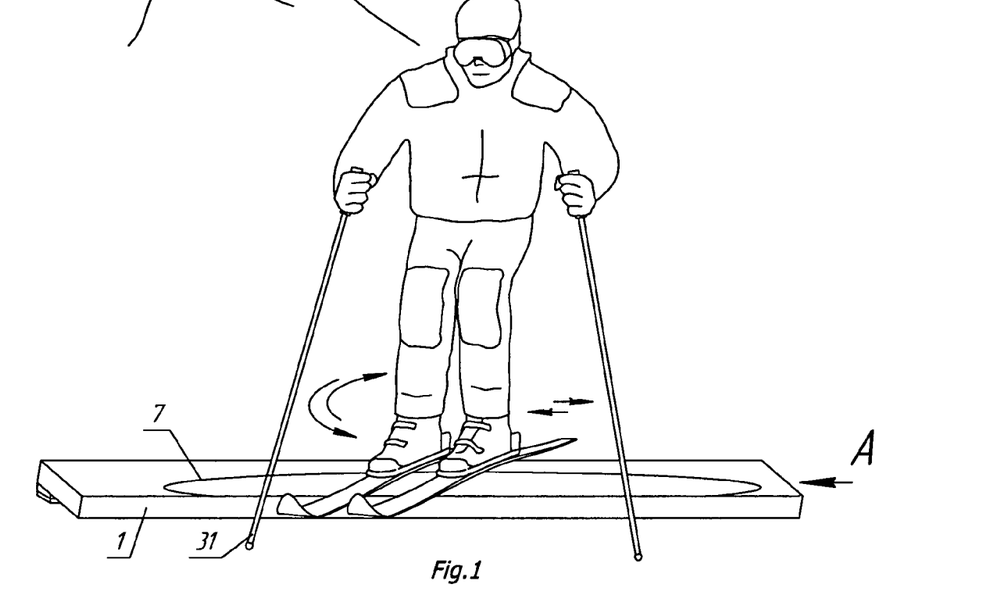
FIG. 1 shows a slalom simulator and a position of a slalomist thereon in a middle part (a load-bearing member and a platform are conditionally not shown)
Figure 2:
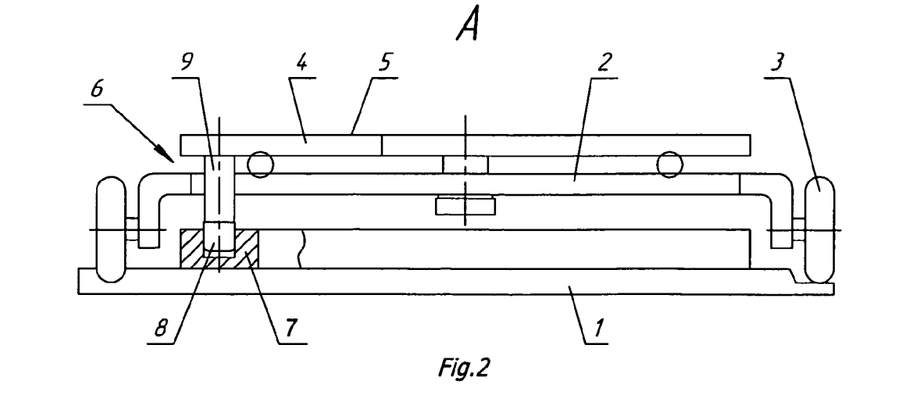
FIG. 2 shows the slalom simulator in a side view according to arrow A in FIG. 1.
Figure 3:
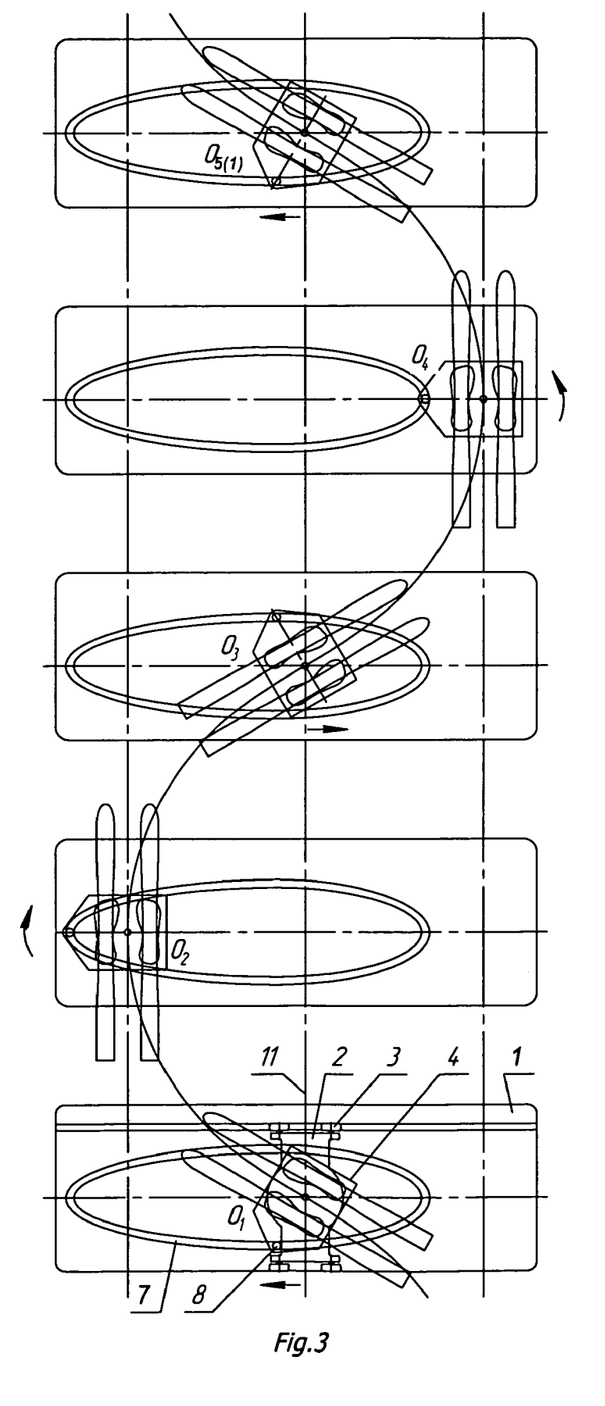
FIG. 3 shows a position of the leg feet (the skis or the snowboard) on the simulator and respectively in a slalom trajectory at characteristic points during alternate reverse of movement of the load-bearing member and rotation of the platform for one period.
Figure 4:
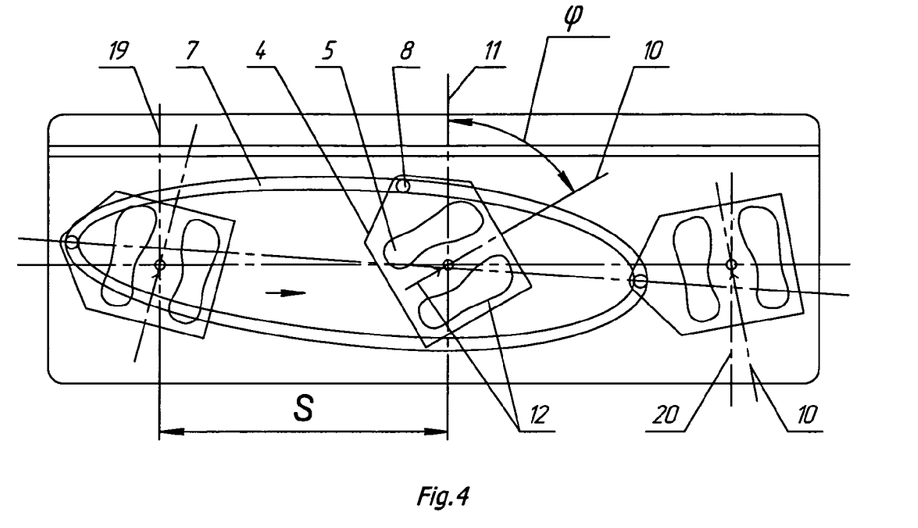
FIG. 4 shows the slalom simulator and a position of the leg feet (platform) thereon in the middle part and at extreme points of the left/right movement (a top view, the load-bearing member is conditionally not shown)
Figure 5:
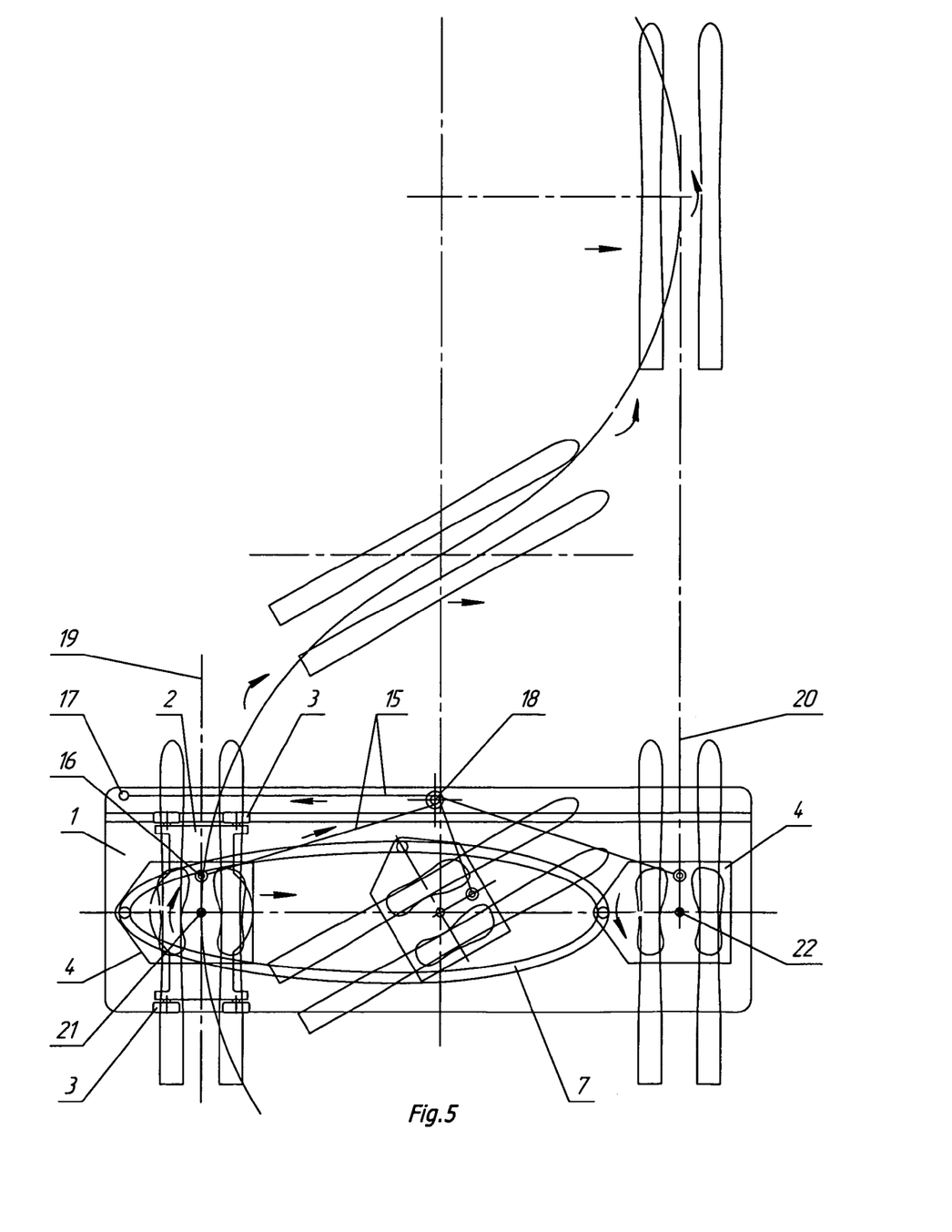
FIGS. 5 and 6 show positions of slalom simulator members and skis when the load-bearing member moves respectively from the extreme left to the extreme right position and from the extreme right to the extreme left position.
Figure 6:
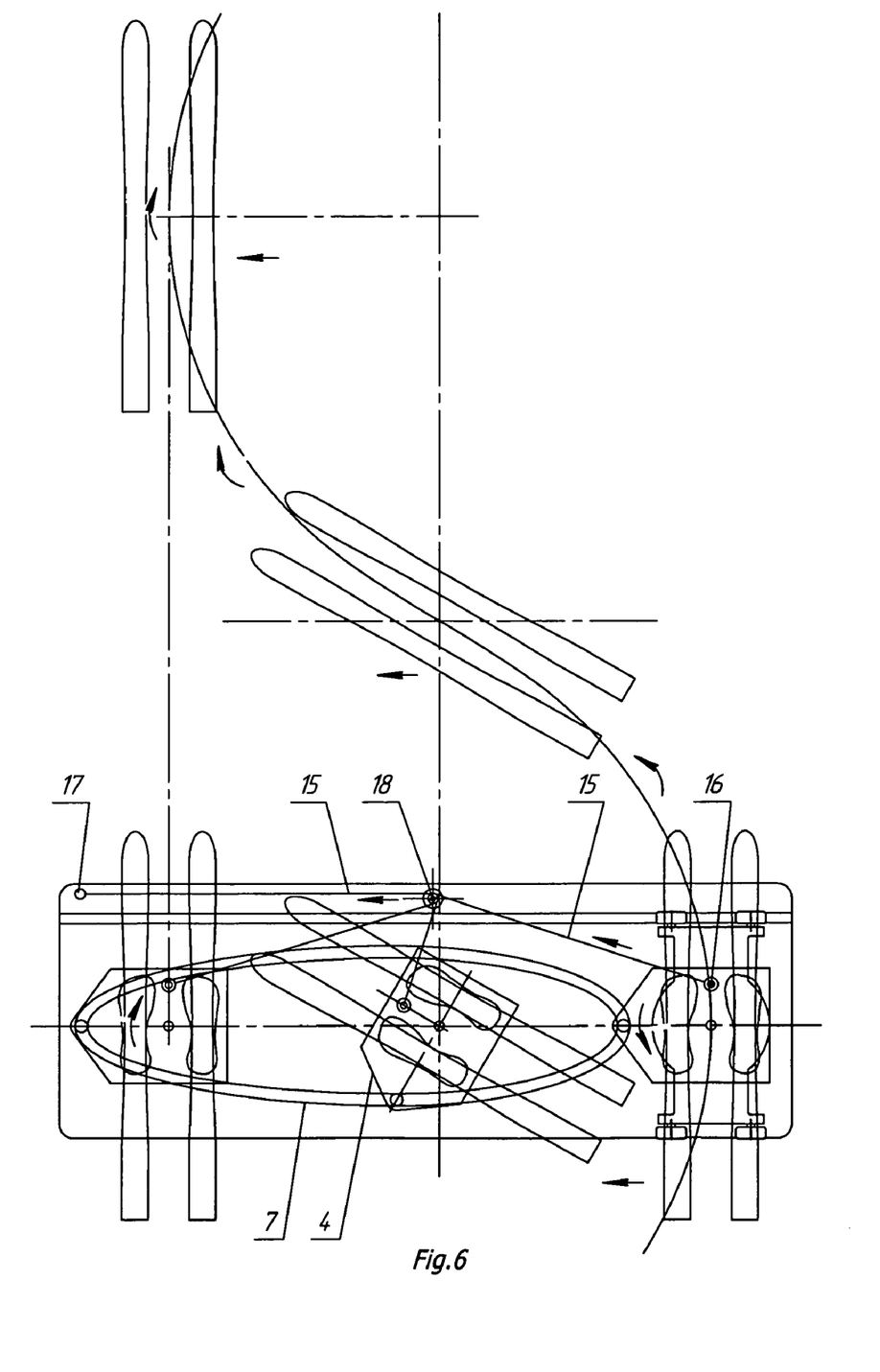
Figure 7:
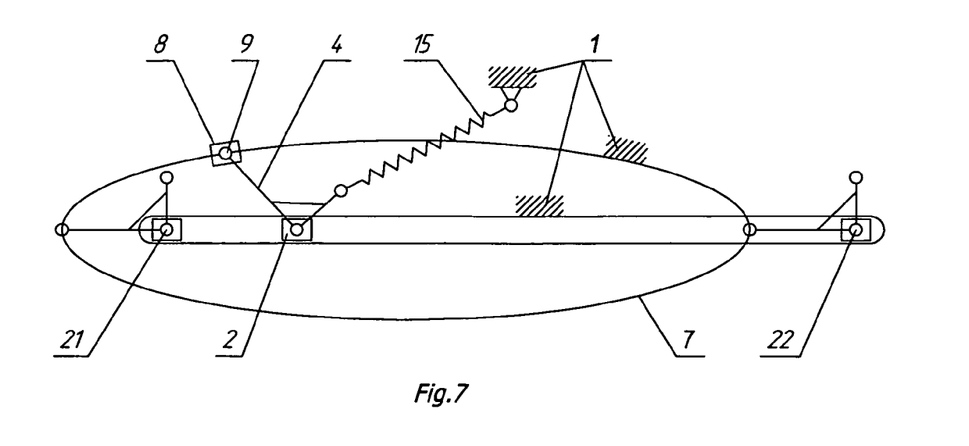
FIG. 7 shows a kinematical diagram of the simulator.

With reference to FIGS. 1 and 2, a slalom simulator comprises a base 1, a load-bearing member 2 mounted on the base so as to move to the left/right, for which purpose said member is mounted, for example, onto a rolling-contact bearing 3 mounted on the load-bearing member 2 so as to rotate periodically clockwise or counterclockwise simultaneously therewith, a platform 4 having a bearing surface 5 for the slalomist's feet, the skis or the snowboard, and a crank-slotted link mechanism 6 for synchronizing and reversing said movement of the load-bearing member 2 and said rotation of the platform 4, said mechanism including a slotted link 7 and a slider 8 connected to a pin 9 fastened on the platform 4 that plays a role of a crank. The slotted link 7 is fastened on the base 1 and is provided with said slider 8 having a closed trajectory of movement, mounted on the slotted link 7 so as to move in one direction thereon, for example clockwise, and allowing the regularity of movement of the platform 4 relative to the base 1 in accordance with the law of slalom motion in part of the translational motion in the left/right movement of the slalomist's feet, the skis or the snowboard mounted on the bearing surface 5, and variation of their angular position in said rotation thereof.

The slotted link 7 is shaped such that, when the slider 8 moves thereon, said shape provides clockwise rotation of the platform 4 relative to the base 1 at movement of the load-bearing member 2 from a middle position O1 to the left till an extreme point O2 and back to the right till a middle position O3, and further counterclockwise rotation at movement of the load-bearing member 2 from the middle position O3 to the right till an extreme point O4 and back to the left till a middle position O5(1) and till achievement of maximum values of an angle φ between a longitudinal axis 10 of the leg feet, the skis or the snowboard being mounted onto the bearing surface 5 and a position symmetry plane 11 of extreme points of the load-bearing member movement when the platform is in the middle position between the extreme points O2 and O4, and till achievement of zero or minimum values of said angle when the platform is at the extreme points.

A mark 12 is applied onto the bearing surface 5 to denote a direction of the longitudinal axis 10 of the slalomist's leg feet, the skis or the snowboard to be mounted onto said bearing surface 5. The mark 12 may be formed, for example, by a paint or embossed on the bearing surface 5.

Figure 8:
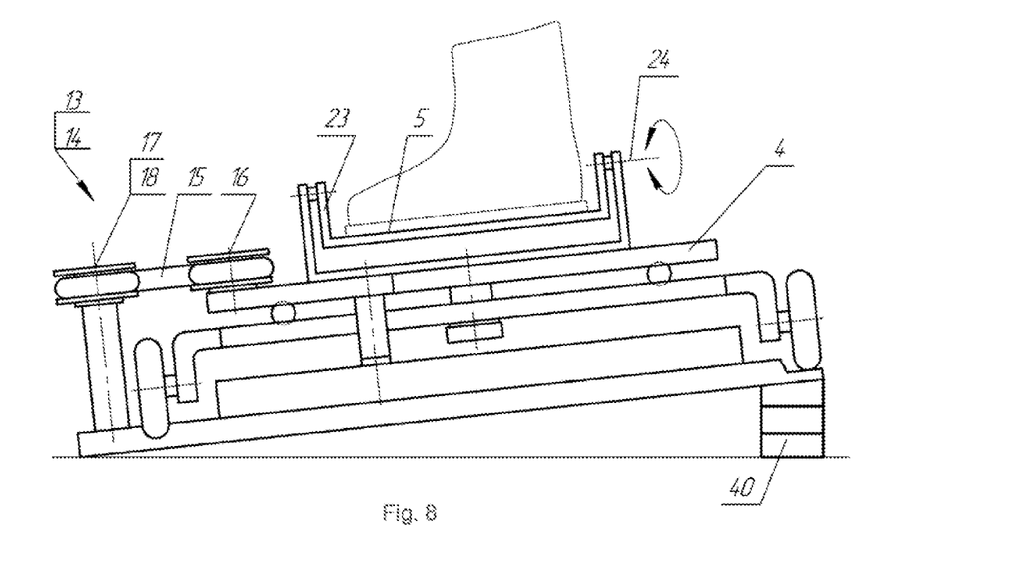
FIG. 8 shows a structure of a bed mounted only to rotate (with edging)

The slalom simulator has means 13 shown in FIG. 8 to exclude a variation in a direction of the movement of the slider 8 over the slotted link 7 and respectively rotation of the platform 4 at the extreme points of reversing the movement of the load-bearing member 2. this means 13 can be embodied, for example, as end springs that develop a torque during motion of the slider 8.

The slalom simulator has also a means 14 to generate a force that counteracts the movement of the load-bearing member 2 from the middle portion of the trajectory towards the extreme points of the movement of said member.

Said means 14 to generate a force that counteracts the movement of the load-bearing member 2 can be embodied as at least one resiliently-deformable traction bar 15 connected by its one end 16 to the load-bearing member 2 and connected with its other end 17 to the base 1 while being kinked over one block 18 fastened on the base 1 at a point positioned between planes 19 and 20 perpendicular to the direction of the movement of the load-bearing member 2 and passing through extreme points 21 and 22 of the movement of the load-bearing member 2.

The resiliently-deformable traction bar 15 may also serve as a means to exclude a variation in a direction of the movement of the slider 8 over the slotted link 7 and respectively rotation of the platform 4 at the extreme points of reversing the movement of the load-bearing member 2, and simultaneously to generate a force that counteracts the movement of the load-bearing member 2 from the middle portion of the trajectory towards the extreme points of the movement of said member. To accomplish this, the end 16 of the traction bar 15 is connected to the platform 4 eccentrically to its rotation axis so as to generate—at extreme points of the movement of the load-bearing member 2—differently directed torques and to provide continuation of the movement at extreme points of the movement of the slider 8 over the closed slotted link 7 in the same unilateral direction.

The slalom simulator has also a means (not shown) to generate a force that counteracts the rotation of the platform 4. This means to generate a force that counteracts the rotation of the platform can be embodied as a resilient member that provides connection of the slider to the platform so as to rotate around its axis.

The slalom simulator has members (not shown) to incline the bearing surface 5 relative to the base 1.

The slalom simulator can have a least one bed 23 connected to the platform 4, and the bearing surface 5 formed on the bed 23.

The bed 23 is movably connected to the platform 4 so as to rotate relative to an axis 24 parallel to its bearing surface 5.

The slalom simulator can have two beds movably connected to the platform 4 so as to offset rectilinearly in reciprocation relative to each other towards the longitudinal axis of the leg feet or the skis placed at the bearing surface 5, and/or so as to rotate them relative to axes parallel to their bearing surfaces similarly to said one bed.

The slalom simulator can have a load-bearing member 2 movement drive (not shown) as well as members (not shown) for fastening the skis, the snowboard or the slalomist's footwear at the bearing surface 5.

Figure 10:
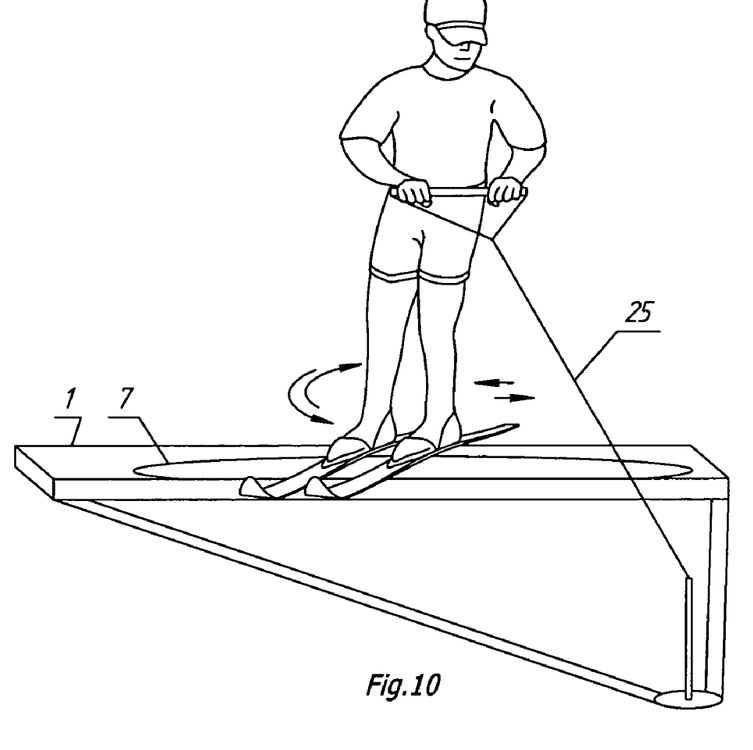
FIG. 10 shows a water-skier-slalomist on the simulator in the middle position provided with a halyard fastened with its one end to a base.
Figure 11:
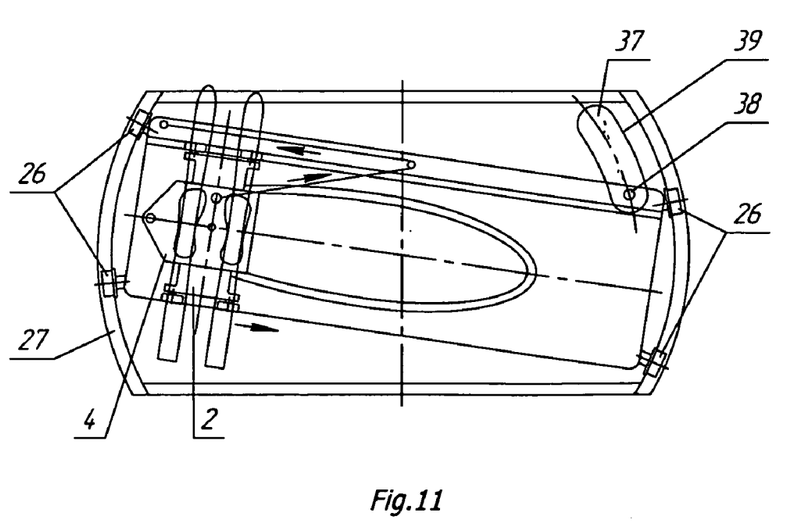
FIGS. 11-14 show the simulator in different positions during movement, wherein the platform is mounted so as to make a short move onward within end sections of the left/right movement of the load-bearing member, and a device to counteract this onward motion.
Figure 12:
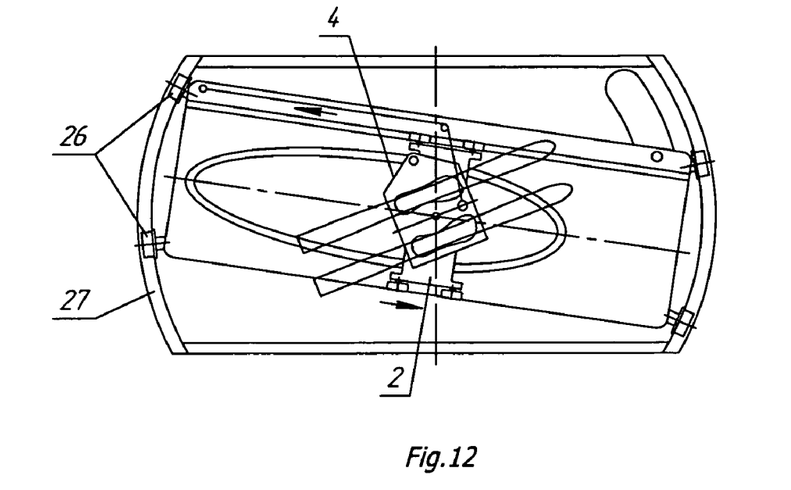
Figure 13:
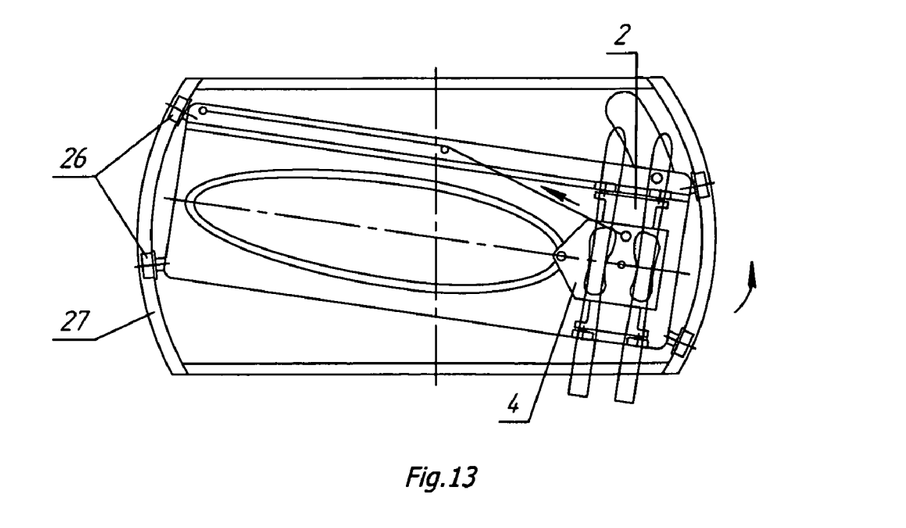
Figure 14:
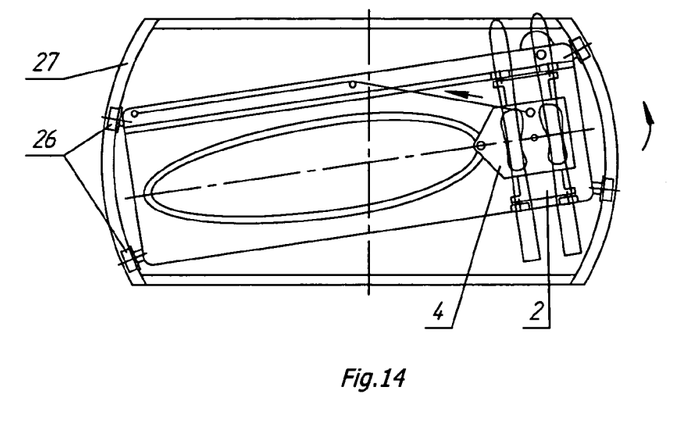

The slalom simulator can have a halyard 25 fastened with its one end to the base 1.

The base 1 can be made so as to vary its angular position relative to a surface said base is mounted on.

The platform 4 with the bearing surface 5 can be mounted so as to make a short move onward within end sections of the left/right movement of the load-bearing member 2. To accomplish this, the base 1 is mounted, for example, onto rolling assemblies 26 that move along guides 27.

Figure 9:
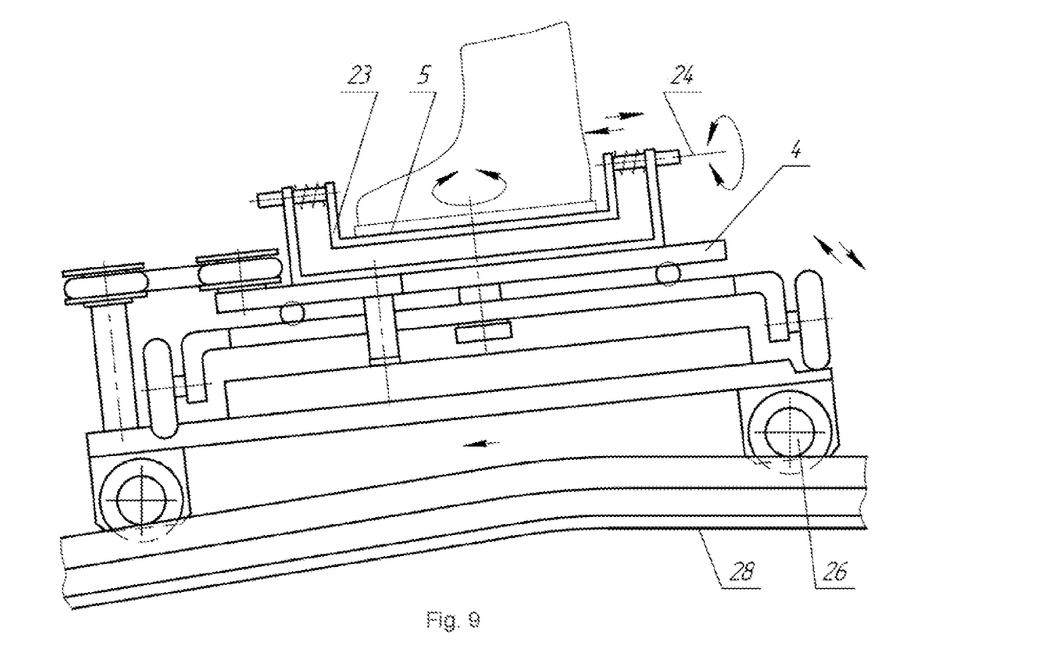
FIG. 9 shows a structure of the bed mounted to rotate and move longitudinally (with edging and disfooting) on the platform of the simulator mounted onto rails so as to move onward along an axis of a slalom route.

The slalom may be capable of providing a regularity of the movement of the platform relative to the base in accordance with the law of slalom motion, including the left/right translational motion of the feet, the skis or the snowboard simultaneously with said rotation and onward movement thereof. To accomplish this, the base 1 is mounted, for example onto rails 28 (FIG. 9) or onto an automobile (not shown) and thereby moves onward along an axis of the slalom route.

Figure 15:
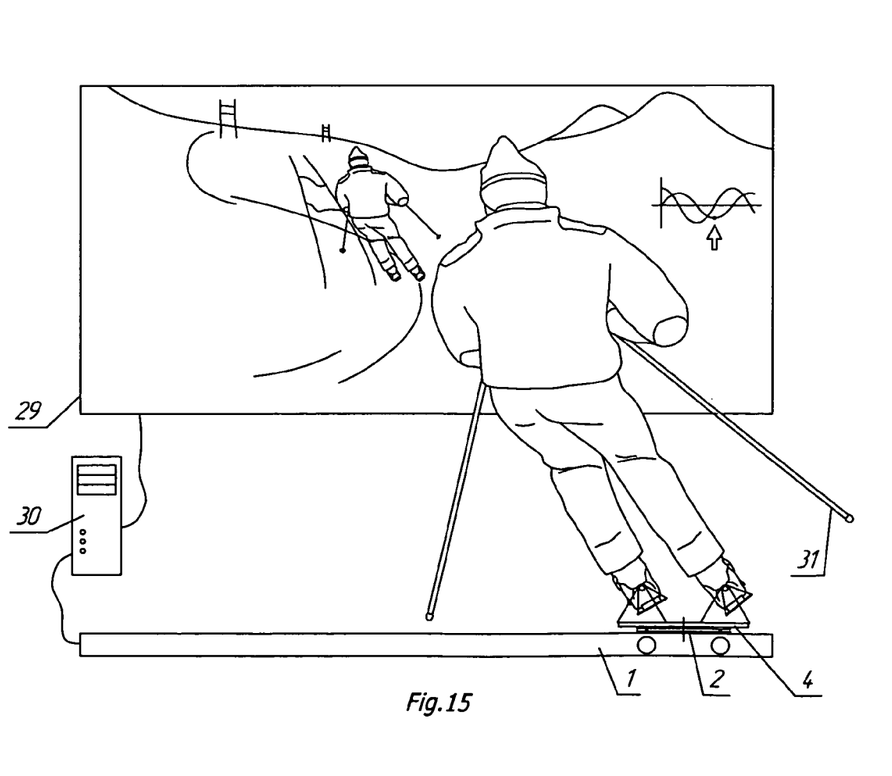
FIG. 15 shows the slalomist in an extreme position on the simulator in front of a screen having an image varied in synchronism using sensors and a computer in accordance with the left/right movement of the load-bearing member and the clockwise or counterclockwise rotation of the platform.
Figure 16:
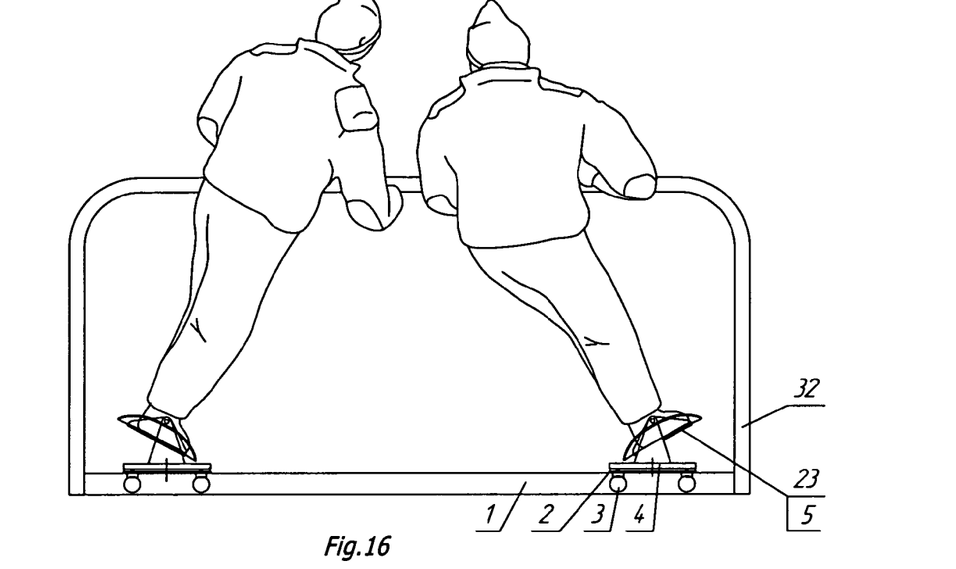
FIG. 16 shows a snowboardist in extreme positions on the simulator (a back view)

A screen 29 can be mounted in front of the slalom simulator, said screen having an image controlled by a computer 30 connected to sensors placed at certain members of the simulator to determine their positions during the left/right movement and the clockwise or counterclockwise rotation. The image of the slalom route in the screen varies in accordance with a position of the slalomist (the platform) at a certain point of the simulator.

The inventive method for teaching and training a slalomist is carried out as follows.

A slalomist (a mountain-skier, a snowboardist, a water-skier being a user of the simulator) stands own leg feet onto the bed 23 or onto the skis or the snowboard mounted at the bearing surface 5 in accordance with the mark 12 and moves the load-bearing member 2 periodically to the left/right while being supported by sticks 31 or a handrail 32, or keeping the halyard 25, thereby to move the leg feet, the skis or the snowboard relative to the base 1. In doing so, the slalomist's legs are inclined to the base 1 (the leg feet are offset to the left relative to the slalomist's center of gravity when the platform rotates clockwise, and to the right when the latter rotates counterclockwise) similarly to inclination that takes place during the ski gliding to make a turn in real slalom.

Simultaneously with said movement of the load-bearing member 2, periodical clockwise or counterclockwise rotation of the platform 4 with the bearing surface 5 and, as a consequence, similar clockwise or counterclockwise rotation of the leg feet, the skis or the snowboard takes place.

Said rotation of the platform 4 is carried out by the crank-slotted link mechanism 6 when the slider 8 moves over the slotted link 7 and by movement of the pin 9 fastened eccentrically on the platform 4.

Figure 17:
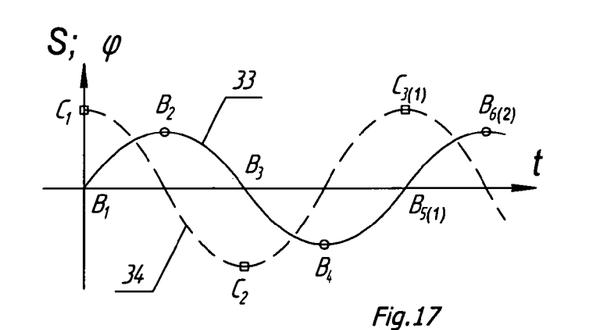

Reverse of said movement of the load-bearing member 2 and said rotation of the platform 4 with the bed 23 (and thereby rotation of the feet, the skis or the snowboard) is carried out alternately (at points C1, B2, C2, B4, C3(1), B6(2) in the graphs of FIG. 17) with shift of original phases of said motions, wherein the regularities of said left/right movement of the load-bearing member 2 for the distance S relative to the base 1 (such a regularity is shown by a solid line 33 in FIG. 17) and said rotation of the platform 4 for an angle φ when said platform rotates relative to the load-bearing member 2 (such a regularity is shown by a dashed line 34 in FIG. 17) for one period correspond to the laws of slalom motion in part of the translational motion in the left/right movement of the slalomist's feet, the skis or the snowboard, and in part of the relative motion, that is, variation of their angular position in said rotation thereof.

This occurs because said rotation of the platform (the leg feet, the skis or the snowboard) relative to the base 1 is clockwise (from the point C1 to the point C2 of the dashed line in FIG. 17) when the load-bearing member 2 (the leg feet, the skis or the snowboard) relative to the base 1 from the middle position (the point B1 in FIG. 17) to the left till the extreme point (the point B2) and back to the middle position (the point B3 in FIG. 17) to the right, and further is counterclockwise (from the point C2 to the point C3(1)) when the load-bearing member 2 (the leg feet, the skis or the snowboard) relative to the base 1 from the middle position (the point B3) to the right till the extreme point (the point B4) and back to the left till the middle position (the point B5(1)), wherein the angle □ between the longitudinal axis 10 of the leg feet, the skis or the snowboard the position symmetry plane 11 of extreme points of their movement achieves its maximum values when the leg feet are in the middle position between the extreme points, and achieves zero or minimum values when the leg feet are at the extreme points.

Figure 18:
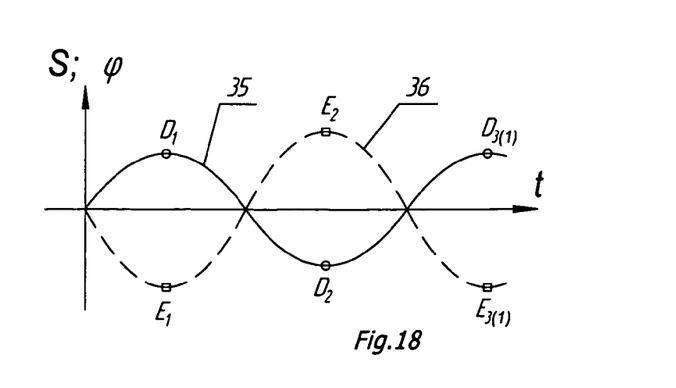

For convenient comparing, FIG. 18 shows the similar regularities for the simulator of the closest similar prior art by curves 35 and 36 that display the simultaneousness of reversing said movement of the load-bearing member and said rotation of the platform (the points D1 and E1, D2 and E2, D3(1) and E3(1) in FIG. 18); this situation does not comply with the slalom motion laws and may signify, for example, ski motion in real skiing by side slipping (across edges) and not a motion in a direction of the longitudinal axis of the skis or the snowboard (along their edges), which in turn does not allow development of correct skills of the slalom technique.

When reversing the load-bearing member 2 that takes place in passage of the slider 8 over a section of the slotted link 7 at locations of the extreme points, the slider cooperates with the means 13 to exclude a variation in a direction of the movement of said slider over the slotted link because of generating an additional force that acts to the slider and coincides with a direction of its movement.

Said left/right movement of the load-bearing member 2 (the leg feet, the skis or the snowboard) and said clockwise or counterclockwise rotation of the platform 4 is carried out freely under action of a slalomist's force or forcedly by means of a movement drive, which also allows approach of the training conditions to real conditions in the slalom route.

Said left/right movement of the load-bearing member (the leg feet, the skis or the snowboard) is accompanied with resistance against said movement, for example, using the resiliently-deformable traction bar 15.

Said left/right movement of the load-bearing member (the leg feet, the skis or the snowboard) and said periodical clockwise or counterclockwise rotation of the platform are carried out by edging and or disfooting by means of the beds 23 mounted so as to rotate relative to an axis parallel to the bearing surface and so as to offset longitudinally relatively to each other due to movable connection of the beds 23 to the platform 4 by respective kinematical pairs.

To feel the perception of real slalom, said periodical clockwise or counterclockwise rotation of the platform 4 (the leg feet, the skis or the snowboard) is carried out with a short move onward within end sections of said left/right movement thereof because the load-bearing member 2 is mounted on rolling members 26 and can advance slightly onward (while rotating over guides 27) under action of the slalomist's inertia of rotation on the platform 4, wherein a resistance is maintained against said short onward motion, for example, from the side of sand 37 the load-bearing member 2 cooperates with, for example, via a special dowel 38 coupled therewith and immersed into a reservoir 39 with sand 37.

Further, said periodical clockwise or counterclockwise rotation of the platform 4 (the leg feet, the skis or the snowboard) is carried out in a plane inclined to a horizontal plane onward relative to the slalomist, for which purpose the base is mounted onto special members 40 that provide said inclination to the simulator.

The simulator mounted so as to move onward along the route axis allows implementation of the claimed method in accordance with the law of slalom motion, including the left/right translational motion of the slalomist's feet, the skis or the snowboard simultaneously with their rotation and onward movement, which approaches the teaching to real slalom conditions yet more.

Presence of the screen 29 in front of the simulator makes it possible to create a virtual perception that the training is in the real slalom route because images variable in the screen, that were filmed during real shussing over a slope, correspond to certain positions of the simulator members and therefore of the slalomist who will feel perceptions similar to that of the slalomist who glides along the real slalom route.

Thus, the inventive method for teaching and training slalomists or any man or women who wishes to be engaged in slalom allows improvement in effectiveness of teaching (that is accelerated and maximally imitates the reality) the slalom technique, and also effectiveness of trainings to maintain skills, for example, during the inter-season period.

The foregoing description and accompanying figures illustrate exemplary embodiments of the present inventions in such a way to enable those skilled in the art to make and use the inventions and various embodiments. Those skilled in the art will understand the foregoing description and accompanying figures explain the principles of the present inventions and their practical application, and they can modify the inventions and embodiments to suit their needs while still following the same principles. Those skilled in the art will also understand the specific terms, nomenclature and formulae in the foregoing description are used to allow those skilled in the art to fully understand the present inventions and do not limit the present inventions to what is described by those terms, nomenclature and formulae. Thus, those skilled in the art will appreciate the foregoing disclosure is not intended to be exhaustive or to limit the inventions to the precise forms disclosed, and those of skill in the art recognize that many modifications and variations are possible in view of the above teachings.

What is claimed is:

1. A method for learning and practicing a slalom movement in combination with a slalom simulator, comprising:
    moving the slalomist's feet, skis or board are continuously mounted on a movable platform of a slalom simulator, together with the platform relative to a base of the slalom simulator periodically left or right;
    rotating the slalomist's feet, skis or board together with the platform periodically clockwise or counterclockwise in a plane of a simulated slalom route;
    wherein said movement and rotation of the slalomist's feet, skis or board together with a platform being carried out with unchangeable direction of a longitudinal axis of the slalomist's feet, skis or a board relative to the platform, synchronously and with an inclination of the slalomist's legs relative to the plane of the simulated slalom route; and
    reversing said movement and rotation of the slalomist's feet, skis or board together with the platform being carried out alternatively with the shifting of the initial phases of said motions.

2. The method of claim 1, wherein
    the clockwise rotation of slalomist's feet, skis or board is performed concurrently with the leftward movement thereof from a middle position to the leftmost position and back to the middle position, and
    the counterclockwise rotation of slalomist's feet, skis or board is performed concurrently with the rightward movement thereof from the middle position to the rightmost position and back to the middle position,
    wherein an angle between a longitudinal axis of the feet, skis or board and a plane of symmetry of the leftmost and rightmost positions thereof is at its maximum value when the feet, skis or board are in the middle position, and zero or minimum value when the feet, skis or board are at the leftmost and rightmost positions.

3. The method of claim 1, wherein said movement and rotation of the slalomist's feet, skis or board are effected by one or more of a force applied by the slalomist and an external force applied by a movement drive of the slalom simulator.

4. The method of claim 1, wherein said movement and rotation of the slalomist's feet, skis or board are carried out with edging and disfooting, and by counteracting said movement.

5. The method of claim 1, wherein said movement comprises a short onward movement in the vicinity of a leftmost and a rightmost positions of the slalomist's feet, skis or board.

6. A slalom simulator comprising:
    a base;
    a load-bearing member mounted on the base and operable to move left or right with respect to the base;
    a platform mounted on the load-bearing member and operable to rotate periodically clockwise or counterclockwise, the platform includes a bearing surface operable to support slalomist's feet, skis or board; and
    a crank-slotted link mechanism for synchronizing and reversing said movement of the load-bearing member and said rotation of the platform,
    wherein the slotted link is fastened on the base and provides a closed trajectory of movement for a slider mounted thereon, for moving in one direction thereon and to provide a regularity of movement of the platform relative to the base in accordance with principles of slalom movements, at least with respect to the translational motion of the slalomist's feet, skis or board during the movement thereof and the variation of the angular position of the slalomist's feet, skis or board during rotation thereof.

7. The slalom simulator of claim 6, wherein the slotted link is shaped such that, when the slider moves thereon, said shape provides clockwise rotation of the platform relative to the base at movement of the load-bearing member from a middle position to the left until an extreme point and back to the right until a middle position, and further counterclockwise rotation at movement of the load-bearing member from the middle position to the right until an extreme point and back to the left until a middle position and until achievement of maximum values of an angle between a longitudinal axis of the feet, the skis or the board being mounted onto the bearing surface and a position symmetry plane of extreme points of the load-bearing member movement when the platform is in the middle position between the extreme points, and until achievement of zero or minimum values of said angle when the platform is at the extreme points.

8. The slalom simulator of claim 6, comprising means for excluding a variation in a direction of the movement of the slider over the slotted link and respectively rotation of the platform at the extreme points of reversing the movement of the load-bearing member, and simultaneously to generate a force that counteracts the movement of the load-bearing member from the middle portion of the trajectory towards the extreme points of the movement of said member.

9. The slalom simulator of claim 6, comprising at least one bed connected to the platform, and the bearing surface is formed on the bed.

10. The slalom simulator of claim 9, comprising two beds, wherein the beds are movably connected to the platform so as to offset in reciprocation relative to each other towards the longitudinal axis of the feet, the skis or the board placed at the bearing surface, for rotating them relative to axes parallel to their bearing surfaces.

11. The slalom simulator of claim 6, comprising a load-bearing member movement drive.

12. The slalom simulator of claim 6, wherein the platform is mounted for making a short move onward within end sections of the left/right movement of the load bearing member.

13. A slalom simulator comprising
   a base;
   a load-bearing member mounted on the base and operable to move left or right with respect to the base; and
   a platform mounted on the load-bearing member and operable to rotate periodically clockwise or counterclockwise, the platform includes a bearing surface operable to support slalomist's feet, skis or board; and
   a crank-slotted link mechanism for synchronizing and reversing said movement of the load-hearing member and said rotation of the platform,
   wherein the slotted link is fastened on the base and provides a closed trajectory of movement for a slider mounted thereon, for moving in one direction thereon and to provide a regularity of movement of the platform relative to the base in accordance with principles of slalom movements, at least with respect to the translational motion of the slalomist's feet, skis or board during the movement thereof and the variation of the angular position of the slalomist's feet, skis or board during rotation thereof and an onward movement thereof.

14. A method for learning and practicing a slalom movement in combination with a slalom simulator, comprising:
   moving the slalomist's feet, skis or board are continuously mounted on a movable platform of a slalom simulator, together with the platform relative to a base of the slalom simulator periodically left or right;
   rotating the slalomist's feet, skis or board together with the platform periodically clockwise or counterclockwise in a plane of a simulated slalom route;
   wherein said movement and rotation of the slalomist's feet, skis or board together with a platform-being carried out with unchangeable direction of a longitudinal axis of the slalomist's feet, skis or a board relative to the platform, synchronously and with an inclination of the slalomist's legs relative to the plane of the simulated slalom route;
   reversing said movement and rotation of the slalomist's feet, skis or board together with the platform being carried out alternatively with the shifting of the initial phases of said motions; and
   moving the base of the slalom simulator forward along the axis of the slalom route.

* * * * *